US012261398B2

(12) United States Patent
Matsuda et al.

(10) Patent No.: US 12,261,398 B2
(45) Date of Patent: Mar. 25, 2025

(54) SHIELD CONNECTOR CAPABLE OF SUPPRESSING IMPENDANCE MISMATCHING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hidekazu Matsuda, Mie (JP); Kazuki Hiramatsu, Mie (JP); Taiga Kadoyama, Mie (JP); Ai Hirano, Mie (JP); Masanao Yamashita, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 352 days.

(21) Appl. No.: 17/868,084

(22) Filed: Jul. 19, 2022

(65) Prior Publication Data

US 2023/0034078 A1 Feb. 2, 2023

(30) Foreign Application Priority Data

Jul. 27, 2021 (JP) ................................ 2021-122065

(51) Int. Cl.

*H01R 13/6582* (2011.01)
*H01R 4/18* (2006.01)
*H01R 13/24* (2006.01)
*H01R 13/6597* (2011.01)

(52) U.S. Cl.

CPC ........... *H01R 13/6582* (2013.01); *H01R 4/18* (2013.01); *H01R 13/24* (2013.01); *H01R 13/6597* (2013.01)

(58) Field of Classification Search

CPC ...... H01R 13/6582; H01R 4/18; H01R 13/24; H01R 13/6597
USPC .................................. 439/497, 108, 607, 95
See application file for complete search history.

(56) References Cited

U.S. PATENT DOCUMENTS 6,217,372 B1 * 4/2001 Reed ................. H01R 13/6593 439/497
6,652,296 B2 * 11/2003 Kuroda ................ H01R 13/405 439/95
8,597,047 B2 * 12/2013 Soubh ................ H01R 13/6477 439/485

(Continued)

FOREIGN PATENT DOCUMENTS

JP 2005-347191 A 12/2005

*Primary Examiner* — Phuong K Dinh
(74) *Attorney, Agent, or Firm* — Venjuris, P.C.

(57) ABSTRACT

A shield connector is provided with a dielectric 40 including a plurality of accommodation chambers 44 defined in a width direction by a separation wall portion 43, and a plurality of inner conductors 21 having a shape elongated in a front-rear direction and individually accommodated in parallel in the plurality of accommodation chambers 44. The separation wall portion 43 is formed with a front opening 53 and a rear opening 60 for interposing air layers between the accommodation chambers 44 adjacent via the separation wall portion 43.

10 Claims, 6 Drawing Sheets

(56) References Cited

U.S. PATENT DOCUMENTS

| | | | | |
|---|---|---|---|---|
| 9,337,557 | B2 * | 5/2016 | Sakamoto ................ | H01R 4/58 |
| 10,541,482 | B2 * | 1/2020 | Sasame ................ | H01R 13/631 |

* cited by examiner

SHIELD CONNECTOR CAPABLE OF SUPPRESSING IMPENDANCE MISMATCHING

CROSS-REFERENCE TO RELATED APPLICATIONS

This application is based on and claims priority from Japanese Patent Application No. 2021-122065, filed on Jul. 27, 2021, with the Japan Patent Office, the disclosure of which is incorporated herein in its entirety by reference.

TECHNICAL FIELD

The present disclosure relates to a shield connector.

BACKGROUND

Japanese Patent Laid-open Publication No. 2005-347191 discloses a shield connector in which a male inner conductor terminal and a female inner conductor terminal are connected by inserting a tab portion of the male inner conductor terminal into a rectangular tube portion of the female inner conductor terminal. A resilient contact piece to be resiliently brought into contact with the tab portion is accommodated inside the rectangular tube portion. The female inner conductor terminal includes a crimping portion extending rearward from the rear end of the rectangular tube portion and a wire is connected to the crimping portion by crimping.

SUMMARY

A front side end region of the rectangular tube portion is a region where metal parts are concentrated since not only the resilient contact piece is present, but also the tab portion is inserted. The crimping portion is also a region where metal parts are concentrated since a core wire of the wire having a diameter larger than a plate thickness of the crimping portion is connected. Impedance is relatively low in the front side end region of the rectangular tube portion and the crimping portion where the metal parts are concentrated. In contrast, metal parts are fewer and impedance is relatively high in a rear side end region of the rectangular tube portion since the resilient contact piece is not present and the tab portion is not inserted. As just described, the conventional shield connector has a problem that impedance matching in the female inner conductor terminal is difficult.

A shield connector of the present disclosure was completed on the basis of the above situation and aims to reduce impedance mismatching.

The present disclosure is directed to a shield connector with a dielectric including a plurality of accommodation chambers defined in a width direction by a separation wall portion, and a plurality of inner conductors having a shape elongated in a front-rear direction, the plurality of inner conductors being individually accommodated in parallel in the plurality of accommodation chambers, the separation wall portion being formed with an opening for interposing an air layer between the accommodation chambers adjacent via the separation wall portion.

According to the present disclosure, it is possible to reduce impedance mismatching.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
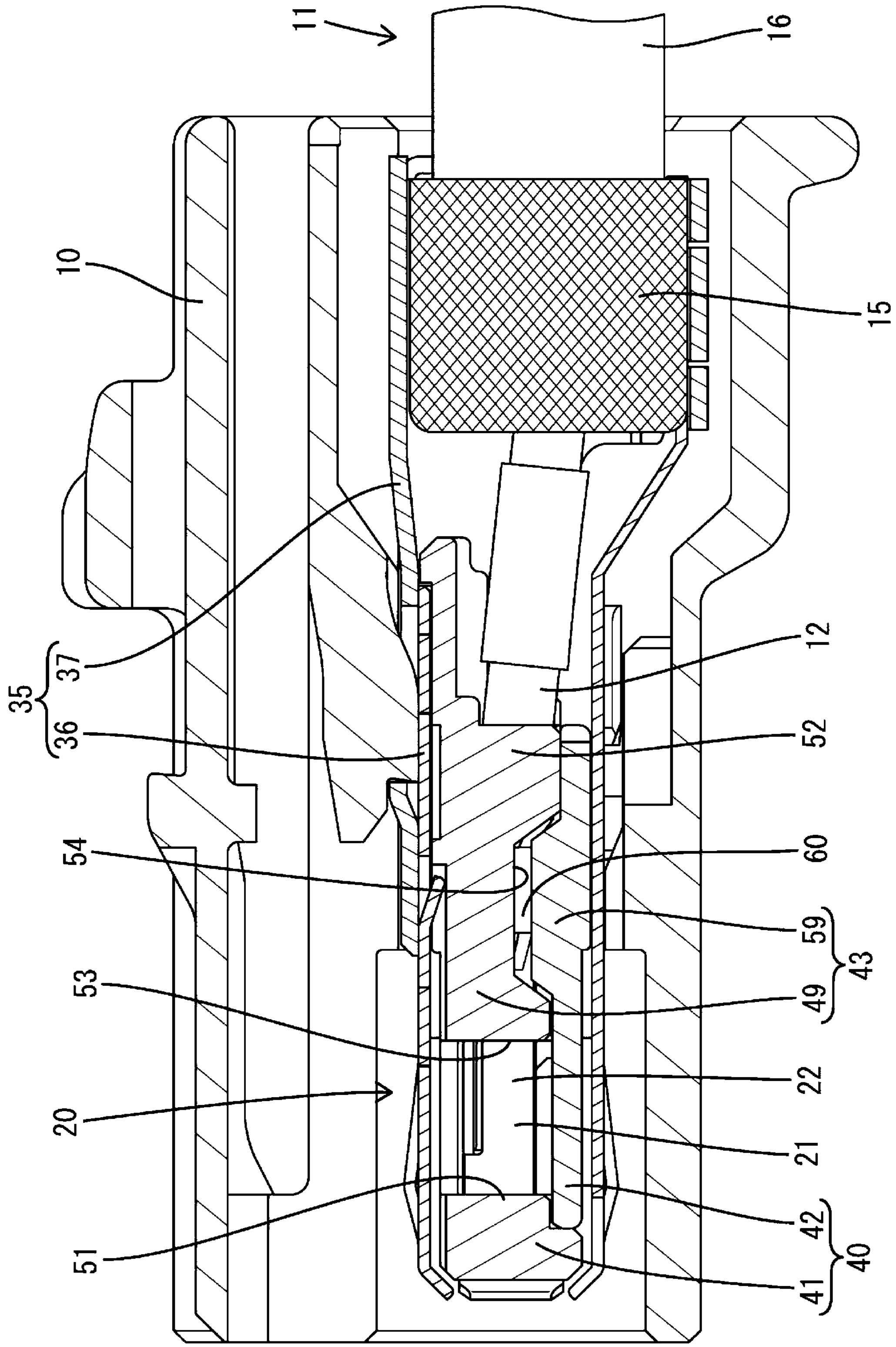
FIG. 1 is a side view of a shield connector of one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The shield connector of the present disclosure is provided with a dielectric including a plurality of accommodation chambers defined in a width direction by a separation wall portion, and a plurality of inner conductors having a shape elongated in a front-rear direction, the plurality of inner conductors being individually accommodated in parallel in the plurality of accommodation chambers, the separation wall portion being formed with an opening for interposing an air layer between the accommodation chambers adjacent via the separation wall portion. According to the configuration of the present disclosure, impedance is increased by the air layer in the opening in a region where the opening is formed in a length direction of the inner conductor, out of a transmission line constituted by the inner conductor. Impedance mismatching in the transmission line constituted by the inner conductor can be reduced by arranging the opening in accordance with a region of the inner conductor where metal parts are concentrated.

(2) Preferably, the inner conductor is made of a metal plate material, a rectangular tube portion is formed in a front end part of the inner conductor in a length direction, a tab of a mating inner conductor being inserted into the rectangular tube portion, a resilient contact piece to be resiliently brought into contact with the tab is accommodated in the rectangular tube portion, and a formation region of the opening includes at least a part of a formation region of the resilient contact piece in the length direction of the inner conductor. According to this configuration, since four plate portions made of metal and the tab made of metal are arranged in a concentrated manner in addition to the resilient contact piece made of metal in the region where the resilient contact piece is accommodated, there is a concern that impedance is reduced. However, in the length direction of the inner conductor, the air layer in the opening is present in the formation region of the resilient contact piece and this air layer is arranged adjacent to the formation region of the resilient contact piece. In this way, impedance in the formation region of the resilient contact piece, out of the transmission line constituted by the inner conductor, can be increased.

(3) Preferably, the inner conductor is made of a metal plate material, a crimping portion to be crimped to a core wire of a wire is formed in a rear end part of the inner conductor in a length direction, and a formation region of the opening includes at least a part of a formation region of the crimping portion in the length direction of the inner conductor. According to this configuration, since the core wire having a diameter larger than a plate thickness of the crimping portion is arranged in a concentrated manner in addition to the crimping portion made of metal in a region where the crimping portion is formed, there is a concern that impedance is reduced. However, in the length direction of the inner conductor, the air layer in the opening is present in the formation region of the crimping portion and this air layer is arranged adjacent to the crimping portion. In this way, impedance in the crimping portion, out of the transmission line constituted by the inner conductor, can be increased.

(4) Preferably, the dielectric includes a pair of cases united in a direction orthogonal to both a parallel direction of the inner conductors and the length direction of the inner conductors, the pair of cases are formed with a pair of wall constituting portions constituting the separation wall portion by projecting to face each other, and the opening is formed between the wall constituting portion formed on one of the cases and the wall constituting portion formed on the other case. According to this configuration, even if the opening is not open in the outer surface of the dielectric, the opening can be molded.

(5) Preferably, the opening is open in an outer surface of the dielectric. According to this configuration, since a large volume of the opening is secured as compared to the case where an opening region of the opening is limited within a range facing the accommodation chambers, an effect of increasing impedance is excellent.

(6) Preferably, the opening is open over an entire region of the accommodation chambers in a height direction, and parts of the separation wall portion in front of and behind the opening are present over the entire region of the accommodation chambers in the height direction. According to this configuration, a displacement of the separation wall portion in the width direction can be restricted and the inner conductors accommodated in the accommodation chambers can be positioned in the width direction on both front and rear sides of the opening.

Details of Embodiment of Present Disclosure

Embodiment

Figure 2:
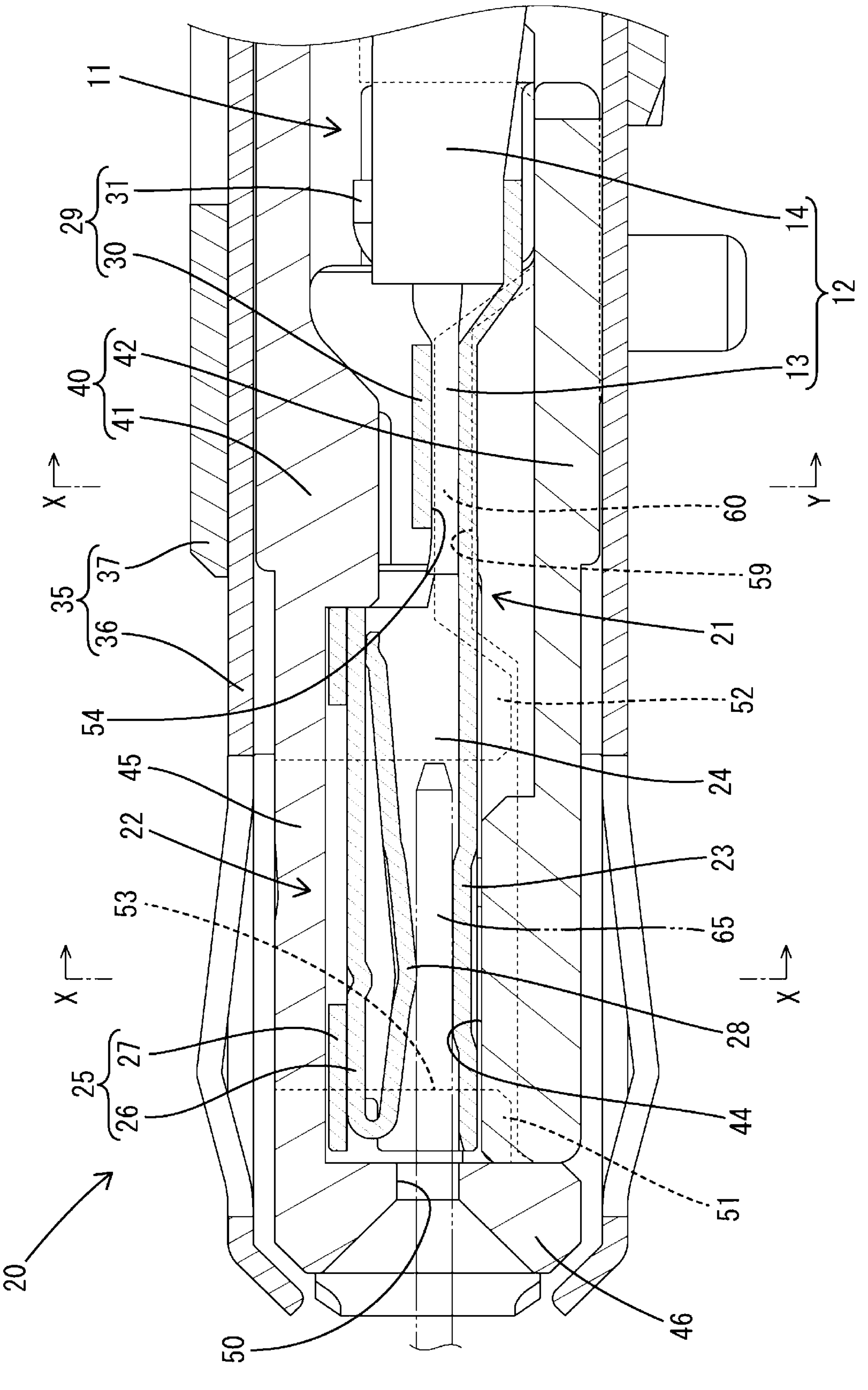
FIG. 2 is a side view in section of a shield terminal.
Figure 3:
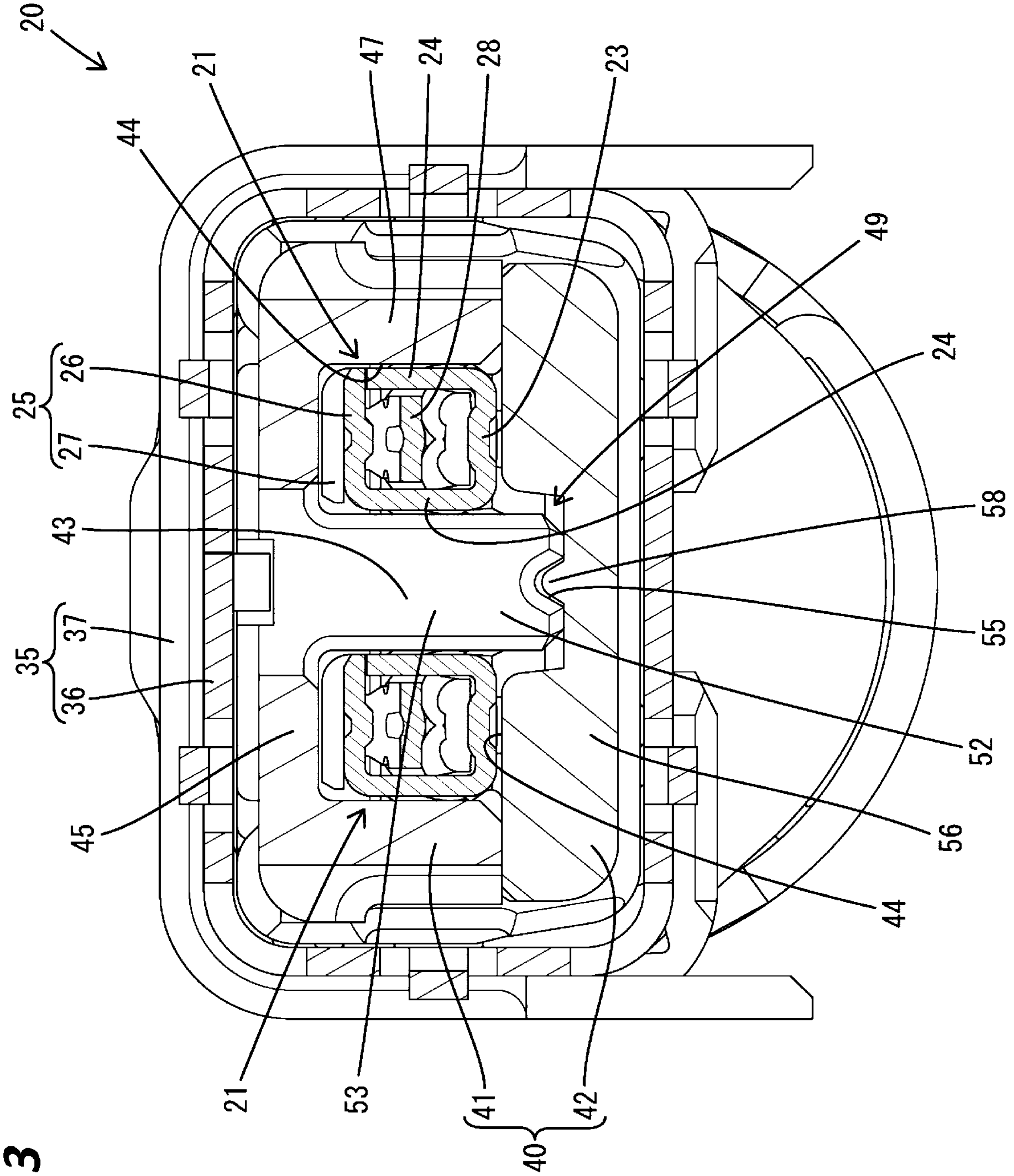
FIG. 3 is a section along X-X of FIG. 2.
Figure 4:
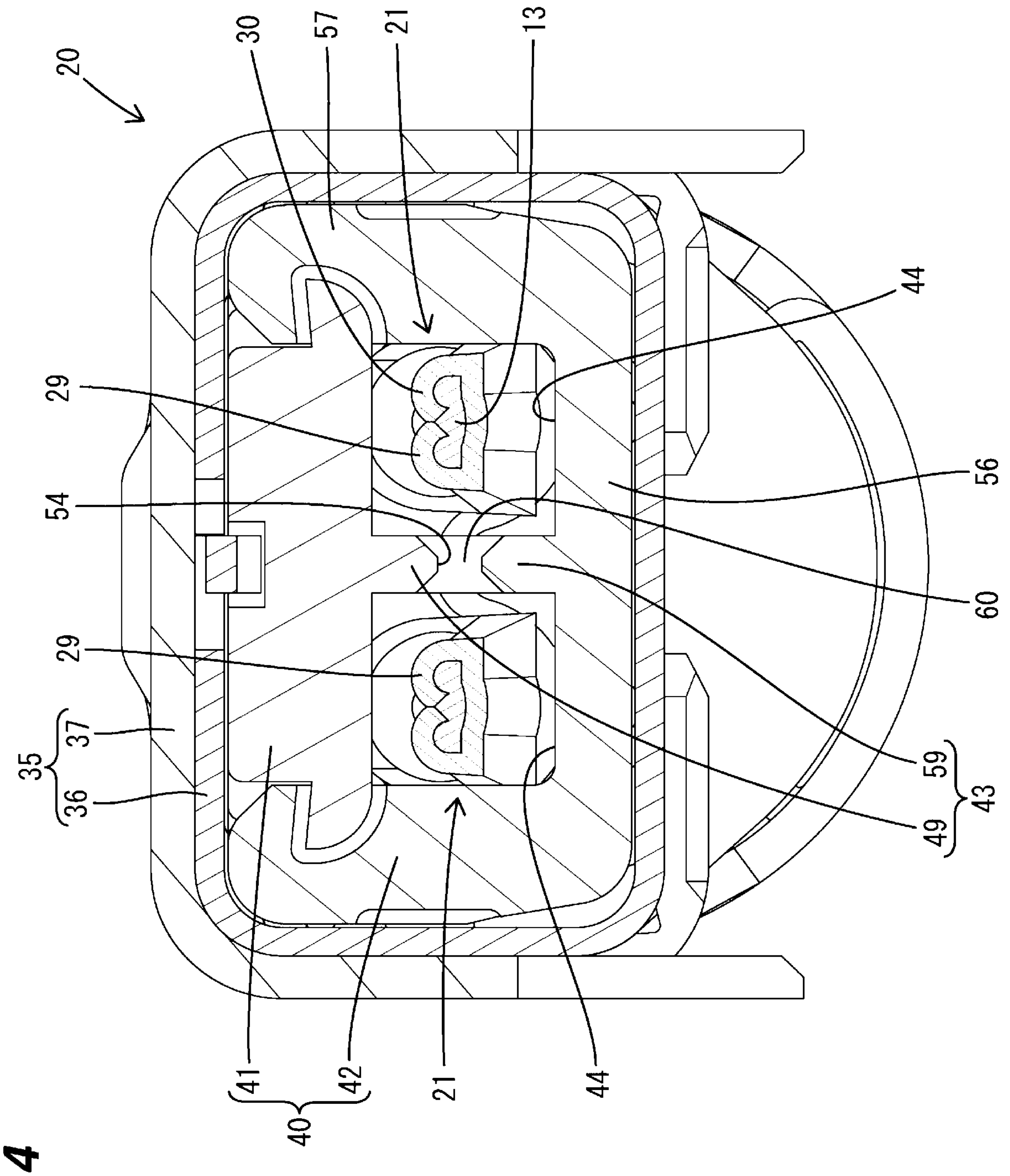
FIG. 4 is a section along Y-Y of FIG. 2.

A specific embodiment of the present disclosure is described below with reference to FIGS. 1 to 6. Note that the present invention is not limited to these illustrations and is intended to be represented by claims and include all changes in the scope of claims and in the meaning and scope of equivalents. In this embodiment, a left side in FIGS. 1 and 2, an oblique left upper side in FIG. 5 and an oblique left lower side in FIG. 6 are defined as a front side concerning a front-rear direction. Upper and lower sides shown in FIGS. 1 to 6 are directly defined as upper and lower sides concerning a vertical direction. Left and right sides shown in FIGS. 3 and 4 are directly defined as left and right sides concerning a lateral direction.

A shield connector of this embodiment is, as shown in FIG. 1, provided with a housing 10 and a shield terminal 20 fixed to a front end part of a shielded cable 11. The shield terminal 20 is accommodated in the housing 10 made of synthetic resin. The shielded cable 11 is a STP (Shielded Twisted Pair) cable and includes two coated wires 12, a shield layer 15 formed by a braided wire, and a sheath 16. Front end parts of the two coated wires 12 extend forward from the front end of the sheath 16. A front end part of the shield layer 15 is folded rearward to surround the outer peripheral surface of the sheath 16.

The shield terminal 20 is configured by assembling a pair of inner conductors 21, a dielectric 40 for accommodating the pair of inner conductors 21 and an outer conductor 35 for surrounding the dielectric 40. The inner conductor 21 is formed into a shape elongated in the front-rear direction by applying bending and the like to a metal plate material. A rectangular tube portion 22 is formed in a part from the front end of the inner conductor 21 to a central part in the front-rear direction of the inner conductor 21. As shown in FIGS. 2 and 3, the rectangular tube portion 22 includes a lower plate portion 23, a pair of left and right side plate portions 24 extending upward from both left and right side edges of the lower plate portion 23 and an upper plate portion 25. The upper plate portion 25 is composed of an inner plate portion 26 extending from the upper end edge of one side plate portion 24 and an outer plate portion 27 extending from the upper end edge of the other side plate portion 24 and laid on the outer surface of the inner plate portion 26.

A resilient contact piece 28 is accommodated in the rectangular tube portion 22. The resilient contact piece 28 is formed by folding a strip-like part extending from the front end edge of the inner plate portion 26 rearward. The resilient contact piece 28 has a chevron shape in a side view. As shown in FIG. 2, a tab 65 of a mating inner conductor (not shown) is inserted into the rectangular tube portion 22. The resilient contact piece 28 resiliently contacts the inserted tab 65.

A crimping portion 29 of the inner conductor 21 extends rearward from the rear end of the rectangular tube portion 22. The crimping portion 29 includes a wire barrel portion 30 in the form of an open barrel and an insulation barrel portion 31 in the form of an open barrel. The wire barrel portion 30 is crimped to the outer peripheral surface of a core wire 13 of the coated wire 12. The insulation barrel portion 31 is crimped to the outer peripheral surface of an insulation coating 14 of the coated wire 12.

The outer conductor 35 is formed by assembling a crimping member 37 with a shield member 36 in the form of a rectangular tube. The shield member 36 is assembled with the dielectric 40 while surrounding the outer peripheral surface of the dielectric 40 over an entire periphery. The crimping member 37 is connected to the front end part of the shield layer 15 by crimping.

The front end part of the shielded cable 11 and a rear end part of the shield terminal 20 are connected by fixing the coated wires 12 and the inner conductors 21 and fixing the outer conductor 35 and the shield layer 15. The shielded cable 11 and the shield terminal 20 constitute a differential transmission line for high speed communication.

The dielectric 40 is made of synthetic resin and, as shown in FIGS. 1 to 4, configured by vertically uniting the upper case 41 and the lower case 42. As shown in FIGS. 3 and 4, with the upper case 41 and the lower case 42 united, a pair of left and right accommodation chambers 44 defined by a separation wall portion 43 are formed inside the dielectric 40. The inner conductors 21 are accommodated in the accommodation chambers 44.

Figure 5:
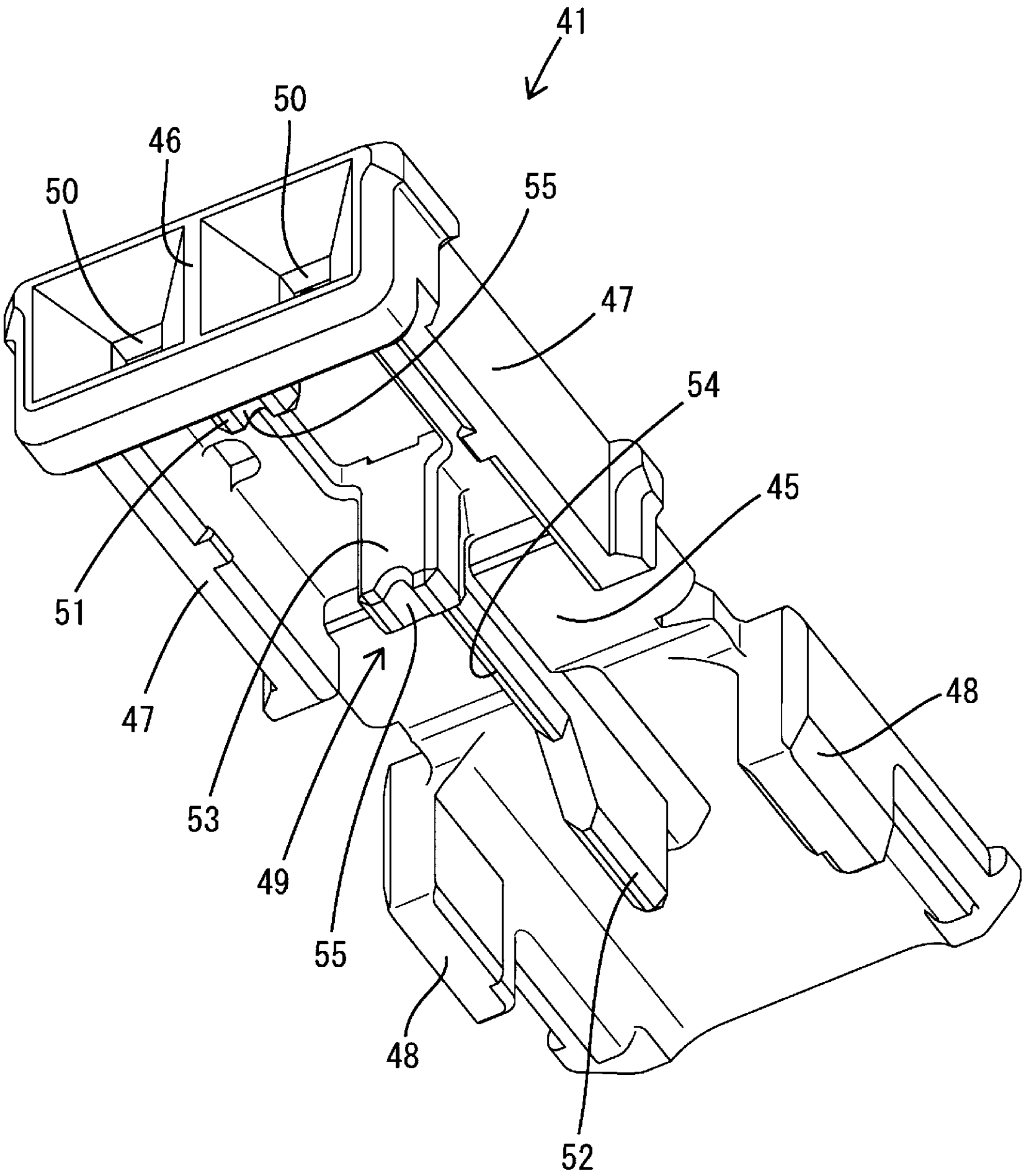
FIG. 5 is a perspective view of an upper case constituting a dielectric.
Figure 6:
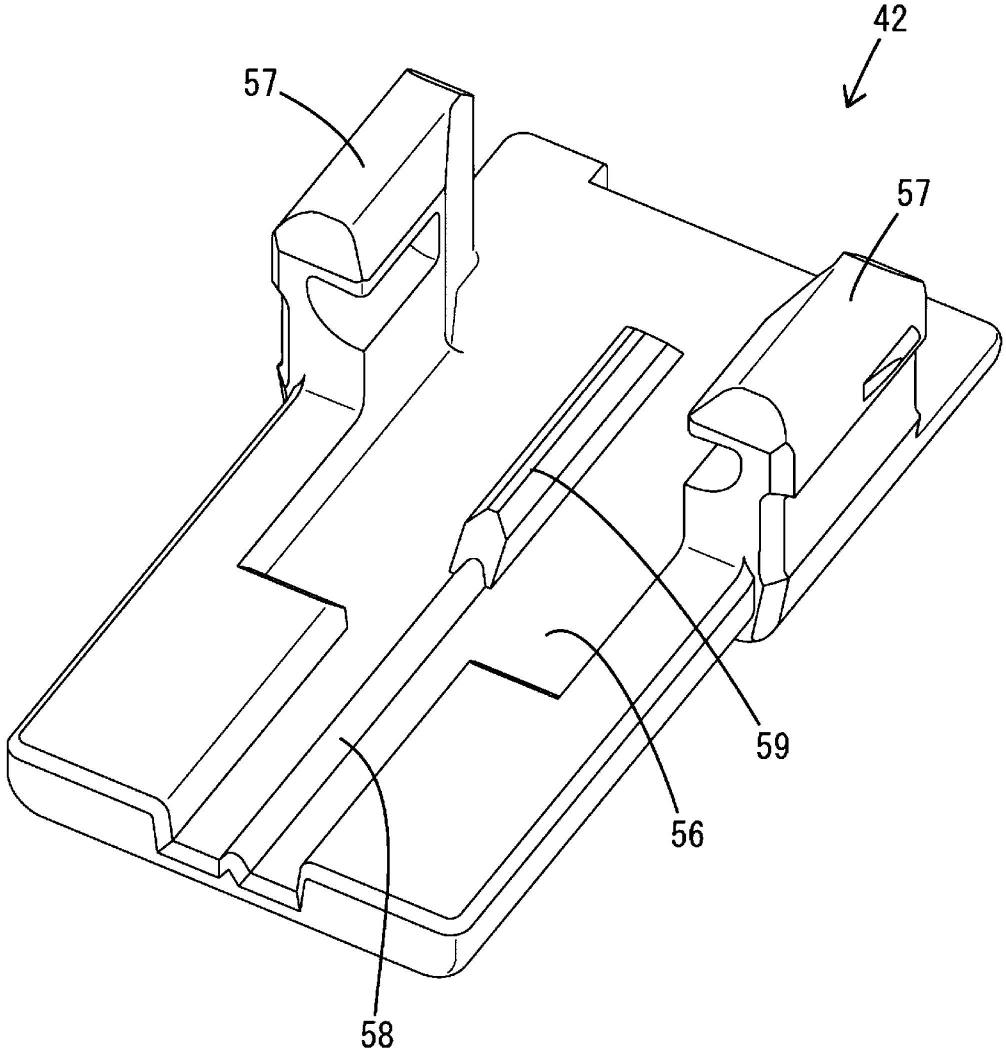
FIG. 6 is a perspective view of a lower case constituting the dielectric.

As shown in FIG. 5, the upper case 41 is a single component including an upper wall portion 45, a front wall portion 46, a pair of left and right upper front side wall portions 47, a pair of left and right upper rear side wall portions 48 and an upper wall constituting portion 49. The front wall portion 46 is formed with a pair of left and right insertion holes 50. The upper front side wall portions 47 project downward from front end parts of both left and right side edges of the upper wall portion 45. The upper front side wall portions 47 are connected to the front wall portion 46. The upper rear side wall portions 48 project downward from positions near rear ends on the both left and right side edges of the upper wall portion 45.

The upper wall constituting portion 49 includes a front partitioning portion 51 and a rear partitioning portion 52 extending in the front-rear direction. The front partitioning portion 51 projects downward from a front end part in a laterally central part of the upper wall portion 45. The front partitioning portion 51 is connected to the front wall portion 46. The rear partitioning portion 52 is arranged behind the front partitioning portion 51 and projects downward from the laterally central part of the upper wall portion 45. A space between the rear end edge of the front partitioning portion 51 and the front end edge of the rear partitioning portion 52 functions as a front opening 53. The upper end of the front opening 53 is open in the upper surface (outer surface) of the upper wall portion 45. The rear partitioning portion 52 is formed with a trapezoidal cut portion 54 by recessing a lower end edge part of the rear partitioning portion 52 upward. Positioning recesses 55 are formed in the lower end surface of the front partitioning portion 51 and the lower end surface of a front end part of the rear partitioning portion 52.

As shown in FIG. 6, the lower case 42 is a single component including a bottom wall portion 56, a pair of left and right lower side wall portions 57, a positioning rib 58 and a lower wall constituting portion 59. The pair of lower side wall portions 57 are arranged at positions behind a center in the front-rear direction of the bottom wall portion 56 and project upward from both left and right side edges of the bottom wall portion 56. The positioning rib 58 is shaped to project upward from a laterally central part of the bottom wall portion 56 and be elongated in the front-rear direction. A formation range of the positioning rib 58 in the front-rear direction is a region from the front end of the bottom wall portion 56 to a central part in the front-rear direction of the bottom wall portion 56.

The lower wall constituting portion 59 is elongated in the front-rear direction and rises upward from the laterally central part of the bottom wall portion 56. The front end of the lower wall constituting portion 59 and the rear end of the positioning rib 58 are connected. A formation range of the lower wall constituting portion 59 in the front-rear direction is a region from the central part in the front-rear direction of the bottom wall portion 56 to a position in front of the rear end of the bottom wall portion 56. In the front-rear direction, the formation range of the lower wall constituting portion 59 is the same as that of the cut portion 54 of the upper wall constituting portion 49. In the lateral direction, a formation range of the lower wall constituting portion 59 is the same as that of the cut portion 54 of the upper wall constituting portion 49. In a side view of the dielectric 40 viewed in parallel to an arrangement direction of the accommodation chambers 44, the lower wall constituting portion 59 has a trapezoidal shape, similarly to the cut portion 54.

With the upper case 41 and the lower case 42 united and the dielectric 40 assembled, the upper wall portion 45 and the bottom wall portion 56 are facing in parallel to each other, and both left and right outer wall portions of the dielectric 40 are constituted by the upper front side wall portions 47, the upper rear side wall portions 48 and the lower side wall portions 57. The lower end surface of the front partitioning portion 51 is facing in proximity to or in contact with the upper surface of the bottom wall portion 56. The lower end surfaces of parts in front of and behind the cut portion 54, out of the rear partitioning portion 52, are facing in proximity to or in contact with the upper surface of the bottom wall portion 56. The lower wall constituting portion 59 is accommodated in the cut portion 54 of the upper wall constituting portion 49. The positioning recesses 55 of the front and rear partitioning portions 51, 52 are fit to the positioning rib 58.

The separation wall portion 43 for defining the pair of accommodation chambers 44 are constituted by the upper wall constituting portion 49 and the lower wall constituting portion 59. A formation range of the separation wall portion 43 is a region from the front end of the front partitioning portion 51 to the rear end of the rear partitioning portion 52. In the formation range of the separation wall portion 43, the front opening 53 and a rear opening 60 for allowing communication between the pair of accommodation chambers 44 are provided. The rear opening 60 is arranged at a position behind the front opening 53. The front and rear openings 53, 60 are spaces for securing air layers between the pair of accommodation chambers 44.

The front opening 53 is a space formed in the upper wall constituting portion 49. In a side view of the shield terminal 20 viewed from the arrangement direction of the pair of accommodation chambers 44, the front opening 53 has a rectangular opening shape. An opening range of the front opening 53 in a height direction in the accommodation chambers 44 is a range larger than total height regions of the separation wall portion 43 and the accommodation chambers 44. Since the upper end of the front opening 53 is open in the outer surface of the dielectric 40, a height of the air layer constituted by the front opening 53 is higher than an opening height of the front opening 53 in the accommodation chambers 44.

As shown in FIG. 2, an opening range (presence range of the air layer) in the front-rear direction of the front opening 53 includes a part of a region where the rectangular tube portions 22 and the resilient contact pieces 28 of the inner conductors 21 and the tabs 65 inserted in the rectangular tube portions 22 are present. An opening range (presence range of the air layer) in the height direction of the front opening 53 is a region expanded further in both upward and downward directions than the total height range of the rectangular tube portions 22.

Since the region where the resilient contact piece 28 and the tab 65 are accommodated in the rectangular tube portion 22, out of a transmission line constituted by the inner conductor 21, is a metal concentrated region where a plurality of metal members are proximately arranged, there is a concern that impedance is reduced. However, since the air layer secured by the front opening 53 is interposed between two metal concentrated regions, impedance is not excessively reduced.

The rear opening 60 is a slit-like space formed between the trapezoidal cut portion 54 of the upper wall constituting portion 49 and a trapezoidal upper edge part of the lower wall constituting portion 59. In a side view, the rear opening 60 has a shape bent along an upper base and a pair of legs of a trapezoid. An opening area of the rear opening 60 in the accommodation chambers 44 is smaller than that of the front opening 53 in the accommodation chambers 44.

As shown in FIG. 2, an opening range (presence range of the air layer) in the front-rear direction of the rear opening 60 is set as a region including a part where the wire barrel portions 30 of the crimping portions 29 and the core wires 13 of the shielded cable 11 are connected by crimping. An opening range (presence range of the air layer) in the height direction of the rear opening 60 is set as a region including connected parts of the wire barrel portions 30 and the core wires 13.

Since a region where the wire barrel portion 30 and the core wire 13 are connected, out of the transmission line constituted by the inner conductor 21, is a metal concentrated region where a plurality of metal members are proximately arranged, there is a concern that impedance is reduced. However, since the air layer secured by the rear opening 60 is interposed between two metal concentrated regions, impedance is not excessively reduced.

Since a metal amount is less in the connection region of the wire barrel portion 30 and the core wire 13 than in the region where the resilient contact piece 28 and the tab 65 are accommodated in the rectangular tube portion 22, the opening area of the rear opening 60 is set smaller than that of the front opening 53. As just described, impedance is increased by the air layers secured by the front and rear openings 53, 60 in the regions with a high metal concentration. In this way, an impedance difference between the regions with a low metal concentration and the regions with a high metal concentration is suppressed low and impedance matching is achieved.

The shield connector of this embodiment includes the dielectric 40 and a plurality of the inner conductors 21. The dielectric 40 includes a plurality of the accommodation chambers 44 defined in the width direction by the separation wall portion 43. The inner conductor 21 has a shape elongated in the front-rear direction. The plurality of inner conductors 21 are individually accommodated in parallel in the plurality of accommodation chambers 44. The separation wall portion 43 is formed with the front and rear openings 53, 60. The front and rear openings 53, 60 are spaces for interposing the air layers between the accommodation chambers 44 adjacent via the separation wall portion 43.

According to this configuration, impedance is increased by the air layers in the front and rear openings 53, 60 in the region where the front opening 53 is formed and the region where the rear opening 60 is formed in a length direction of the inner conductor 21, out of the transmission line constituted by the inner conductor 21. Since the front and rear openings 53, 60 are arranged in accordance with the concentrated regions of the metal parts in the inner conductor 21, impedance mismatching of the transmission line constituted by the inner conductor 21 can be reduced.

The inner conductor 21 is made of a metal plate material. A front end part of the inner conductor 21 in the length direction is formed with the rectangular tube portion 22, into which the tab 65 of the mating inner conductor (not shown) is inserted. The resilient contact piece 28 to be resiliently brought into contact with the tab 65 is accommodated in the rectangular tube portion 22. Since the four plate portions 23 to 27 made of metal and the tab 65 made of metal are arranged in a concentrated manner in addition to the resilient contact piece 28 made of metal in the region where the resilient contact piece 28 is accommodated, there is a concern that impedance is reduced. As a countermeasure against this, a formation region of the front opening 53 is set to include at least a part of a formation region of the resilient contact piece 28 in the length direction of the inner conductor 21. In the length direction of the inner conductor 21, the air layer in the front opening 53 is present in the formation region of the resilient contact piece 28 and this air layer is arranged adjacent to the formation region of the resilient contact piece 28. In this way, impedance in the formation region of the resilient contact piece 28, out of the transmission line constituted by the inner conductor 21, can be increased.

The crimping portion 29 to be crimped to the core wire 13 of the coated wire 12 is formed in a rear end part of the inner conductor 21 in the length direction. Since the core wire 13 having the diameter larger than the plate thickness of the crimping portion 29 is arranged in a concentrated manner in addition to the crimping portion 29 made of metal in the region where the crimping portion 29 is formed, there is a concern that impedance is reduced. As a countermeasure against this, a formation region of the rear opening 60 is set to include at least a part of a formation region of the crimping portion 29 in the length direction of the inner conductor 21. In the length direction of the inner conductor 21, the air layer in the rear opening 60 is present in the formation region of the crimping portion 29 and this air layer is arranged adjacent to the crimping portion 29. In this way, impedance in the crimping portion 29, out of the transmission line constituted by the inner conductor 21, can be increased.

The dielectric 40 includes the upper case 41 and the lower case 42 united in the vertical direction. A uniting direction of the upper case 41 and the lower case 42 is a direction orthogonal to both a parallel direction of the pair of inner conductors 21 and the length direction of the inner conductors 21. The upper case 41 is formed with the upper wall constituting portion 49, and the lower case 42 is formed with the lower wall constituting portion 59. The upper and lower wall constituting portions 49, 59 project to face each other and constitute the separation wall portion 43. The rear opening 60 is formed between the upper wall constituting portion 49 formed on the upper case 41 and the lower wall constituting portion 59 formed on the lower case 42. The rear opening 60 is not open in the outer surface of the dielectric 40, but can be molded.

The front opening 53 is open in the outer surface of the dielectric 40. According to this configuration, a large volume of the front opening 53 is secured as compared to the case where the opening region of the front opening 53 is limited within a range facing the accommodation chambers 44. Thus, an effect of increasing impedance is excellent.

The front opening 53 is open over an entire region of the accommodation chambers 44 in the height direction. Parts of the separation wall portions 43 in front of and behind the front opening 53, i.e. the front end part of the rear partitioning portion 52 and the front partitioning portion 51, are present over the entire region of the accommodation chambers 44 in the height direction. According to this configuration, a displacement of the separation wall portion 43 in the width direction can be restricted and the inner conductors 21 accommodated in the accommodation chambers 44 can be positioned in the width direction on both front and rear sides of the front opening 53.

Other Embodiments

Although the dielectric is configured by uniting the pair of cases in the above embodiment, the dielectric may be a single component. In this case, if an opening is open in the outer surface of the dielectric, the opening can be molded.

Although two openings are formed in one separation wall portion in the above embodiment, the number of opening(s) may be one, three or more.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A shield connector, comprising:

a dielectric including a plurality of accommodation chambers defined in a width direction by a separation wall portion; and a plurality of inner conductors having a shape elongated in a front-rear direction and made of a metal plate material, the plurality of inner conductors being individually accommodated in parallel in the plurality of accommodation chambers, the separation wall portion being formed with an opening for interposing an air layer between the accommodation chambers adjacent via the separation wall portion, wherein a rectangular tube portion is formed in a front end part of each of the inner conductors in a length direction, a tab of a mating inner conductor being inserted into the rectangular tube portion, a resilient contact piece to be resiliently brought into contact with the tab is accommodated in the rectangular tube portion, and a formation region of the opening includes at least a part of a formation region of the resilient contact piece in the length direction of each of the inner conductors.

2. The shield connector of claim 1, wherein:

a crimping portion to be crimped to a core wire of a wire is formed in a rear end part of each of the inner conductors in a length direction, and a formation region of the opening includes at least a part of a formation region of the crimping portion in the length direction of the inner conductor.

3. The shield connector of claim 1, wherein:

the dielectric includes a pair of cases united in a direction orthogonal to both a parallel direction of the inner conductors and the length direction of the inner conductors, the pair of cases are formed with a pair of wall constituting portions constituting the separation wall portion by projecting to face each other, and the opening is formed between the wall constituting portion formed on one of the cases and the wall constituting portion formed on the other case.

4. The shield connector of claim 1, wherein the opening is open in an outer surface of the dielectric.

5. The shield connector of claim 1, wherein:

the opening is open over an entire region of the accommodation chambers in a height direction, and parts of the separation wall portion in front of and behind the opening are continuous over the entire region of the accommodation chambers in the height direction.

6. A shield connector, comprising:

a dielectric including a plurality of accommodation chambers defined in a width direction by a separation wall portion; and a plurality of inner conductors having a shape elongated in a front-rear direction, the plurality of inner conductors being individually accommodated in parallel in the plurality of accommodation chambers, the separation wall portion being formed with an opening for interposing an air layer between the accommodation chambers adjacent via the separation wall portion, wherein the dielectric includes a pair of cases united in a direction orthogonal to both a parallel direction of the inner conductors and the length direction of the inner conductors, the pair of cases are formed with a pair of wall constituting portions constituting the separation wall portion by projecting to face each other, and the opening is formed between the wall constituting portion formed on one of the cases and the wall constituting portion formed on the other case.

7. The shield connector of claim 6, wherein:

the inner conductor is made of a metal plate material, a rectangular tube portion is formed in a front end part of each of the inner conductors in a length direction, a tab of a mating inner conductor being inserted into the rectangular tube portion, a resilient contact piece to be resiliently brought into contact with the tab is accommodated in the rectangular tube portion, and a formation region of the opening includes at least a part of a formation region of the resilient contact piece in the length direction of each of the inner conductors.

8. The shield connector of claim 6, wherein:

the inner conductor is made of a metal plate material, a crimping portion to be crimped to a core wire of a wire is formed in a rear end part of each of the inner conductors in a length direction, and a formation region of the opening includes at least a part of a formation region of the crimping portion in the length direction of each of the inner conductors.

9. The shield connector of claim 6, wherein the opening is open in an outer surface of the dielectric.

10. The shield connector of claim 6, wherein:

the opening is open over an entire region of the accommodation chambers in a height direction, and parts of the separation wall portion in front of and behind the opening are continuous over the entire region of the accommodation chambers in the height direction.

* * * * *